Patented May 16, 1950

2,507,517

UNITED STATES PATENT OFFICE 2,507,517

TRIFUNCTIONAL DISILMETHYLENE COMPOUNDS AND HYDROLYSIS PRODUCTS

Harold A. Clark, Midland, Mich., assignor to Dow Corning Corporation, Midland, Mich., a corporation of Michigan No Drawing. Application March 19, 1949, Serial No. 82,472

10 Claims. (Cl. 260—46.5)

The present invention relates to new organosilicon compositions, and to their methods of production.

The present organosilicon industry is based upon siloxanes which are materials in which the silicon atoms are linked through oxygen atoms. Another type of compound is one in which the silicon atoms are linked directly to each other. Still a third type is one in which the silicon atoms are linked by organic radicals. The literature presents very little information on this last type of compound.

Objects and advantages of the present invention are to produce organosilicon compositions in which the silicon atoms are linked by methylene radicals. Other objects and advantages of the present invention will be apparent from the following description and the subjoined claims.

The compositions hereof have the type formula $R_2YSiCH_2SiY_2R$ where each R represents a radical of the group consisting of alkyl and monocyclicaryl radicals and each Y represents a substituent of the group consisting of alkoxy radicals and halogen atoms. Thus, each R may be an alkyl radical as from methyl to octadecyl or a monocyclicaryl radical such as phenyl and tolyl.

In accordance with the process of the present invention these new organosilicon compositions are produced by reacting a Grignard reagent of the group consisting of alkyl and monocyclicaryl Grignard reagents with a compound of the type $RY_2SiCH_2SiY_2R$ where each R represents a radical of the group consisting of alkyl and monocyclicaryl radicals and each Y represents a substituent of the group consisting of alkoxy radicals and halogen atoms.

The Grignard reagent employed in the reaction hereof is used in amount sufficient to replace one of the substituents, Y, in the compound $RY_2SiCH_2SiY_2R$ with a radical of the group consisting of alkyl and monocyclicaryl radicals, and preferably in amount between 0.5 and 1.5 mols of Grignard reagent per mol of the silicon compound. As is known in the art of Grignard reactions, this may be effected by mixing an ethyl ether solution of the Grignard reagent and the liquid halogeno-disilmethylene compound. The product may be purified by filtering and distilling if desired. The compounds of the type $RY_2SiCH_2SiY_2R$ may be obtained in accordance with the method described in an application filed by me simultaneously herewith.

The products hereof are of substantial utility as intermediates in the production of other organosilicon compositions. The compositions of the present invention, $R_2YSiCH_2SiRY_2$, may be reacted with an organolithium compound to produce disilmethylene compounds which have diverse organic radicals on the silicon atoms. Also, the compositions of the present invention may be hydrolyzed and condensed either alone or in mixture with other organosilicon chlorides to produce organosiloxanes. When cohydrolyzed and condensed with a triorganosilicon halide, stable fluids are obtained. When hydrolyzed alone or with a mono- or di-organosilicon halide, siloxanes are obtained which may be condensed to resinous solids, and which are useful in formulating heat and weather resistant coatings for boilers, stacks, ovens and other hot metal surfaces. Thus, if from 40 to 95 mol percent of

$(CH_3)_2ClSiCH_2SiCl_2CH_3$ is cohydrolyzed and condensed with from 60 to 5 mol percent of $C_6H_5SiCl_3$, resins with excellent properties are produced. These resins have a curing rate of less than 1 hour at 100° C. and they remain flexible for over 168 hours at 250° C. Likewise, if from 5 to 50 mol percent of

$(CH_3)_2ClSiCH_2SiCl_2CH_3$ is cohydrolyzed and condensed with from 95 to 50 mol percent of $CH_3HSiCl_2$, fluids are obtained which are useful in treating fabrics to make them water-repellent. Up to one half of the disilmethylene compound may be replaced with either $(CH_3)_2ClSiCH_2SiCl_3$ or with $C_6H_5SiCl_3$ in equivalent amount or with both.

The following examples illustrate the method of the present invention.

Example 1

A mixture of 182.5 parts by weight of

$ClCH_2CH_3Si(OC_2H_5)_2$ and 64.5 parts of $(CH_3)_2SiCl_2$ was added to 46 parts of molten sodium in 216.9 parts of toluene. The temperature was maintained at 110° C. The products were then cooled, filtered and the salt cake washed with toluene. Upon distillation, there were obtained 17.8 parts of

$(C_2H_5O)_2CH_3SiCH_2Si(CH_3)_2OC_2H_5$

This composition was found to have a boiling point of 112° C. at 25 mm., a density of 0.8914 at 25° C., a refractive index of 1.4148 at 25° C., and a specific refraction of 0.2802.

Example 2

A mixture of 37.7 parts by weight of

$CH_3Cl_2SiCH_2SiCl_3$ and 75.4 parts of $CH_3Cl_2SiCH_2SiCl_2CH_3$ was added to 622.44 parts of $C_6H_5MgCl$ in ether solution. The reaction mixture was diluted with toluene, refluxed for one and one-half hours, filtered, and the salt cake washed with toluene. The products were then stripped solvent free. The residue contained $CH_3Cl_2SiCH_2SiClC_6H_5CH_3$ $C_6H_5CH_3ClSiCH_2SiCl_2C_6H_5$ and $CH_3Cl_2SiCH_2SiCl(C_6H_5)_2$.

The residue was added with stirring to 1000 parts of $H_2O$. The hydrolyzate was washed acid free and was a resin.

Example 3

When equimolar amounts of $CH_3MgCl$ in ether solution and $CH_3Cl_2SiCH_2SiCl_2CH_3$ are mixed, coupling occurs. The product $(CH_3)_2ClSiCH_2SiCl_2CH_3$ may be purified by filtering and by distilling the reaction mixture. This product has a boiling point of 186° C. at atmospheric pressure and a density of 1.160 at 25° C.

224 parts by weight of this composition were mixed with 211.5 parts of $C_6H_5SiCl_3$. This mixture was diluted with 129.9 parts of toluene. The mixture was added to 433 parts of toluene in 1000 parts of cold water. The organic layer was separated and shaken with $NaHCO_3$. It was washed, filtered and concentrated to 55% solids. There was an 80% yield of a resin, which resin had a curing rate of less than 1 hour at 100° C. The resin remained flexible for over 168 hours at 250° C.

Example 4

A mixture of 432 parts of $(CH_3)_2ClSiCH_2SiCl_2CH_3$ and 108 parts of $(CH_3)_2ClSiCH_2SiCl_3$ was mixed with 60 parts of $C_6H_5SiCl_3$. 182 parts of toluene were then added to the mixture. The mixture was next added to 500 parts of toluene in 1200 parts of cold water. An additional 200 parts of toluene and 100 parts of n-butanol were added. The organic layer was separated and shaken with $NaHCO_3$. It was washed, filtered and concentrated to 100% solids. The resin was bodied by heating to 180–190° C. for 6 hours. It was then diluted with aromatic naphtha and toluene yielding 462 parts of a resin solution of 53½% solids. This resin cures in 1 hour at 250° C. yielding a tough pliable film. It had excellent electrical insulating properties having a resistance of 1000 volts per mil thickness of the resin.

Example 5

A mixture of 80 parts by weight of $(CH_3)_2ClSiCH_2SiCl_2CH_3$ and 20 parts of $(CH_3)_2ClSiCH_2SiCl_3$ was mixed with 150 parts of $CH_3HSiCl_2$ and added to 135 parts of toluene. This mixture was then added to 255 parts of toluene. The mixture poured into a mixture of 385 parts of $NaHCO_3$, 500 parts of cold water and 500 parts of ice. The organic layer was separated and filtered. 800 parts of 15% solution resulted. Fabrics were dipped in a 3% solution of this resin, and cured at 150° C. The fabrics were thereby made permanently water-repellent.

Example 6

A mixture of 64 parts by weight of $(CH_3)_2ClSiCH_2SiCl_2CH_3$ and 16 parts of $(CH_3)_2ClSiCH_2SiCl_3$ was mixed with 280 parts of $CH_3HSiCl_2$ and 40 parts of $C_6H_5SiCl_3$ and added to 100 parts of toluene. This mixture was then added to 400 parts of toluene in 1800 parts of cold water. The hydrolysis resulted in an emulsion which was broken with methyl ethyl ketone. The reaction mixture was neutralized with $NaHCO_3$. 1200 parts of a 15% solution resulted. Fabrics were dipped in a 3% solution of this resin and cured at 150° C. The fabrics were thereby made permanently water-repellent.

That which is claimed is:

1. Compositions of the general formula $R_2YSiCH_2SiY_2R$ in which each R represents a radical of the group consisting of alkyl and monocyclicaryl radicals, and each Y represents a substituent of the group consisting of alkoxy radicals and halogen atoms.

2. Compositions in accordance with claim 1 in which each R represents methyl.

3. Compositions in accordance with claim 1 in which each R represents a radical of the group consisting of methyl and phenyl radicals and which contains both methyl and phenyl radicals.

4. $(CH_3)_2ClSiCH_2SiCl_2CH_3$.

5. $C_6H_5CH_3ClSiCH_2SiCl_2CH_3$.

6. $(C_2H_5O)_2CH_3SiCH_2SiOC_2H_5(CH_3)_2$.

7. The method which comprises reacting a Grignard reagent of the group consisting of alkyl and monocyclicaryl Grignard reagents with a compound of the type $RY_2SiCH_2SiY_2R$ in liquid phase where each R represents a radical of the group consisting of alkyl and monocyclicaryl radicals and each Y represents a substituent of the group consisting of alkoxy radicals and halogen atoms, the Grignard reagent being employed in proportion between 0.5 and 1.5 mols per mol of the silicon compound, whereby a product of the formula $R_2YSiCH_2SiY_2R$ is obtained.

8. The method in accordance with claim 7 in which each R represents methyl.

9. A resinous organosilicon material obtained from the hydrolysis of compositions of the general formula $R_2YSiCH_2SiY_2R$ where each R represents a radical of the group consisting of alkyl and monocyclicaryl radicals and each Y is a substituent of the group consisting of halogen atoms and alkoxy radicals.

10. An organosilicon material obtained by the cohydrolysis and cocondensation of from 5 to 50 mol percent of a compound of the group $(CH_3)_2YSiCH_2SiY_2CH_3$ $(CH_3)_2YSiCH_2SiY_3$; and $C_6H_5SiY_3$, at least 50 mol percent thereof being $(CH_3)_2YSiCH_2SiY_2CH_3$ and from 95 to 50 mol percent of $CH_3HSiY_2$ where each Y is a substituent of the group consisting of halogen atoms and alkoxy radicals, whereby a fluid is produced.

HAROLD A. CLARK.

REFERENCES CITED

The following references are of record in the file of this patent:

UNITED STATES PATENTS

| Number | Name | Date |
|---|---|---|
| 2,352,974 | Rochow | July 4, 1944 |
| 2,381,000 | Patnode et al. | Aug. 7, 1945 |
| 2,467,858 | Sage | Apr. 19, 1949 |

OTHER REFERENCES

Bluestein, Journ. Amer. Chem. Soc. vol. 70, September 1948, pp. 3068 to 3071.